UNITED STATES PATENT OFFICE.

RUDOLF EMMERICH, OF MUNICH, GERMANY.

PROCESS OF PRESERVING MEATS.

SPECIFICATION forming part of Letters Patent No. 680,374, dated August 13, 1901.

Application filed March 28, 1898. Serial No. 675,474. (No specimens.)

*To all whom it may concern:*

Be it known that I, RUDOLF EMMERICH, a citizen of Germany, residing at Munich, in the Kingdom of Bavaria and Empire of Germany, have invented certain new and useful Improvements in the Art of Preserving Meats; and I do hereby declare the following to be a full, clear, and exact description of the invention, such as will enable others skilled in the art to which it appertains to make and use the same.

My invention relates to improvements in the art of preserving meats.

In those processes for the preservation of meat hitherto known to me it has been usual to subdivide and trim the carcass without regard to the retention of the natural bacteria and fungus proof coatings, such as the membranes, sinews, &c. The subdivided portions have then sometimes been treated with various chemicals for the purpose of destroying or preventing the development of bacteria or mold on the freshly-cut surfaces. Such treatment resulted in serious injury to the qualities of the meat, altering its taste in a disadvantageous manner, reducing its nourishing qualities, rendering it less digestible, and, indeed, in some cases causing it to be actually injurious to health. Instead of treating the subdivided portions with chemicals it has sometimes been exposed to the action of heat or of cold, such as in jerking the meat or in freezing it. By such exposure the flesh loses the desirable qualities of fresh or raw meat. By my method the above-named disadvantages are largely, if not entirely, overcome, as will be fully understood by those skilled in the art from the description hereinafter.

My invention consists in retaining on the carcass as much of the natural bacteria-proof and mold-proof membranes and sinews as possible and then packing the carcass in a sterilized hygroscopic material.

To carry out my method, the carcass of the slaughtered animal is not subdivided, or, if it be absolutely necessary that some subdivision should be made, the subdivisions are as few as possible, so that they will be largely protected by the natural membranes and sinews of the carcass and so that there will be as few cut surfaces as possible. Of course it is obvious that in the slaughtering of an animal some such cut surfaces will result. These, however, as above stated, should be as few as possible and must be protected from the attacks of bacteria or fungus. In order to do this and as a part of my method, I treat such cut surfaces with an antiseptic or germicidal solution or material, preferably vinegar and salt, until the cut surfaces are acted upon to a slight depth. That portion of the carcass which is protected by membranes or sinews is also preferably treated with such a germicidal or antiseptic solution for the purpose of killing any germs which may be upon the exterior of such membranes or sinews and to assist in rendering the said membranes and sinews better able to resist the attacks of bacteria or fungus. The carcass or the large subdivisions of it, if necessity compels that some subdivisions be made, are then packed in a hygroscopic sterilized mass which is pressed into close contact with the entire surface of the carcass or portion thereof. This packing material may be saw-dust or the like, which is sterilized and dried by means of heat prior to its use as packing material, and while still warm is pressed into all the cavities of the carcass and into close contact with all the surfaces. The object of this packing is to absorb the moisture of the membranes and sinews and of the outer surfaces of the cut portions, whereby the latter are dried and kept dry in order that the attacks of bacteria will be reduced to a minimum. In order to increase the efficiency of the saw-dust when such is employed as a packing material, the said saw-dust may be impregnated with a suitable antiseptic prior to being heated—for instance, with a solution of salt. For the purpose of retaining the packing material in and around the carcasses they are preferably packed in boxes, casks, or the like.

By my process it will be found that the best success is attained when the carcass is not subdivided, trimmed, or skinned, it being advisable to retain even the hide on the carcass. The result is that the flesh will be preserved in its natural and fresh condition for in a length of time sufficient to allow the meat to be transported long distances and held in storage for a reasonable time awaiting a market.

Having thus fully described my invention, what I claim as new, and desire to secure by Letters Patent, is—

1. The process of preserving meats which consists in treating the exterior of the meat on which the natural membranes and sinews including the hide have been left, with an antiseptic and then packing the said carcass in hygroscopic sterilized material.

2. The process of preserving meats which consists in treating the exterior of the meat, on which the natural membranes and sinews including the hide have been left, with an antiseptic, and then packing the said carcass with dried and sterilized sawdust.

3. The process of preserving meats which consists in treating the exterior of the meat, upon which the natural membranes and sinews have been left with an antiseptic, then packing dried and sterilized sawdust, while still warm around the entire carcass.

4. The process of preserving meats, which consists in retaining on the carcass the hide and sinews, treating the cut surfaces with vinegar and salt, and filling the cavities with dried sawdust.

In testimony whereof I affix my signature in presence of two witnesses.

RUDOLF EMMERICH.

Witnesses:
 EMIL HENZEL,
 N. VERDOSTETTER.